(12) United States Patent
Kobayashi

(10) Patent No.: US 10,104,242 B2
(45) Date of Patent: Oct. 16, 2018

(54) INFORMATION PROCESSING DEVICE, INFORMATION PROCESSING METHOD AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Yujiro Kobayashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 159 days.

(21) Appl. No.: 15/223,375

(22) Filed: Jul. 29, 2016

(65) Prior Publication Data
US 2017/0272582 A1  Sep. 21, 2017

(30) Foreign Application Priority Data
Mar. 17, 2016  (JP) .................................. 2016-053428

(51) Int. Cl.
*H04N 1/04* (2006.01)
*H04N 1/00* (2006.01)

(52) U.S. Cl.
CPC ....... *H04N 1/00095* (2013.01); *H04N 1/0001* (2013.01); *H04N 2201/0094* (2013.01)

(58) Field of Classification Search
CPC ......... H04N 21/4622; H04N 21/23605; H04N 21/43; H04N 21/4343; H04N 21/4345; H04N 1/327; H04N 1/00891; H04N 1/00928; H04N 1/32016; H04N 1/32037; H04N 1/3209; H04N 1/32771; H04N 1/32795; H04N 2101/00; H04N 21/2662; H04N 21/43615; H04N 21/43637; H04N 21/6437; H04N 21/64792; H04N 2201/0084; H04N 2201/0086; H04N 2201/0093; H04N 2201/0096; H04N 2201/0098; H04N 2201/3207; H04N 2201/3209; H04N 2201/3219; H04N 2201/3274; H04N 2201/3278; H04N 1/0001; H04N 1/00095; H04N 1/32363; H04N 1/32603; H04N 1/32797; H04N 21/234381; H04N 21/2393; H04N 21/25841; H04N 21/26283;
(Continued)

(56) References Cited

U.S. PATENT DOCUMENTS

2003/0070466 A1* 4/2003 Horii ..................... B21B 31/103
                                                           72/229
2006/0282466 A1* 12/2006 Yasukaga .............. G06F 21/606
(Continued)

FOREIGN PATENT DOCUMENTS

EP         1162822 A2 * 12/2001 ........... H04N 1/0014
JP       2005-079886 A    3/2005

*Primary Examiner* — Negussie Worku
(74) *Attorney, Agent, or Firm* — Oliff PLC

(57) ABSTRACT

An information processing device includes: a setting unit that, in a case where an image is transmitted to a plurality of destinations, performs setting of whether or not a destination of the image is an essential destination; and a transmission control unit that performs control such that: in a case where the destination of the image is the essential destination, transmission to the essential destination is performed prior to transmission to a non-essential destination; and, in a case where trouble occurs in the transmission to the essential destination, transmission subsequent to the transmission to the essential destination is ended.

18 Claims, 9 Drawing Sheets

(58) Field of Classification Search
CPC .......... H04N 21/41407; H04N 21/472; H04N 21/47202; H04N 21/4753; H04N 21/478; H04N 21/4882; H04N 21/643; H04N 21/6587; H04N 21/8193; H04N 2201/0094; H04N 2201/3287; H04N 7/17336; G06F 17/214; G06F 21/10; G06F 2221/0706; G06F 3/12; G06F 11/2066; G06F 11/2071; G06F 13/28; G06F 13/4068; G06F 17/30017; G06F 19/3481; G06F 21/6209; G06F 3/061; G06F 3/065; G06F 3/067; G06F 8/41; G06F 8/76
USPC ....... 709/238, 217, 223, 227, 206, 230, 245, 709/203, 218, 224, 236, 242, 249, 250; 358/440, 444, 468, 400, 434, 439, 442; 379/167.06, 170, 171, 185
See application file for complete search history.

(56) References Cited

U.S. PATENT DOCUMENTS

| | | | | |
|---|---|---|---|---|
| 2006/0290972 | A1* | 12/2006 | Izumisawa | H04N 1/00214 358/1.15 |
| 2007/0086065 | A1* | 4/2007 | Wada | H04N 1/00127 358/402 |
| 2007/0133054 | A1* | 6/2007 | Kobayashi | G06K 15/00 358/1.16 |
| 2007/0268526 | A1* | 11/2007 | Ito | H04N 1/00214 358/403 |
| 2007/0276586 | A1* | 11/2007 | Jeon | G01C 21/3608 701/533 |
| 2011/0157618 | A1* | 6/2011 | Odaira | H04N 1/32037 358/1.14 |
| 2011/0237184 | A1* | 9/2011 | Minoshima | G01C 21/362 455/39 |
| 2011/0246061 | A1* | 10/2011 | Hayashi | G01C 21/343 701/533 |
| 2012/0250079 | A1* | 10/2012 | Kobayashi | H04N 1/00411 358/1.15 |
| 2014/0278091 | A1* | 9/2014 | Horvitz | G01C 21/3679 701/533 |
| 2014/0323078 | A1* | 10/2014 | Miyata | H04W 4/22 455/404.1 |
| 2016/0065978 | A1* | 3/2016 | Hiwatashi | H04N 19/31 375/240.02 |
| 2016/0371151 | A1* | 12/2016 | Masuda | G06F 11/1451 |

\* cited by examiner

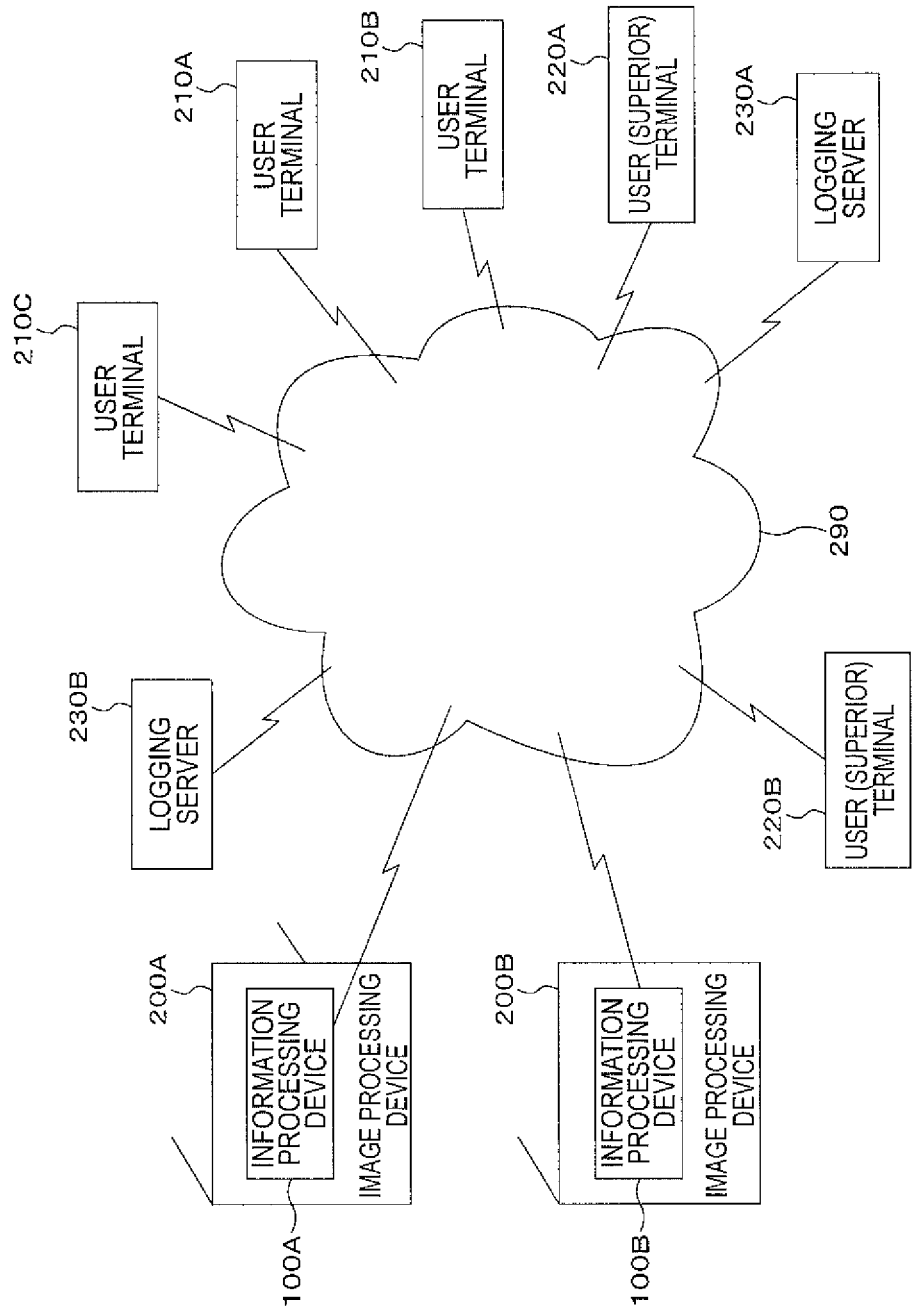

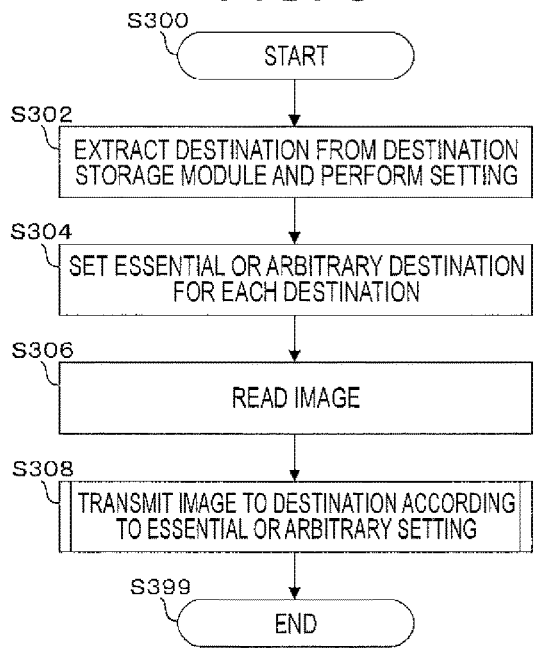

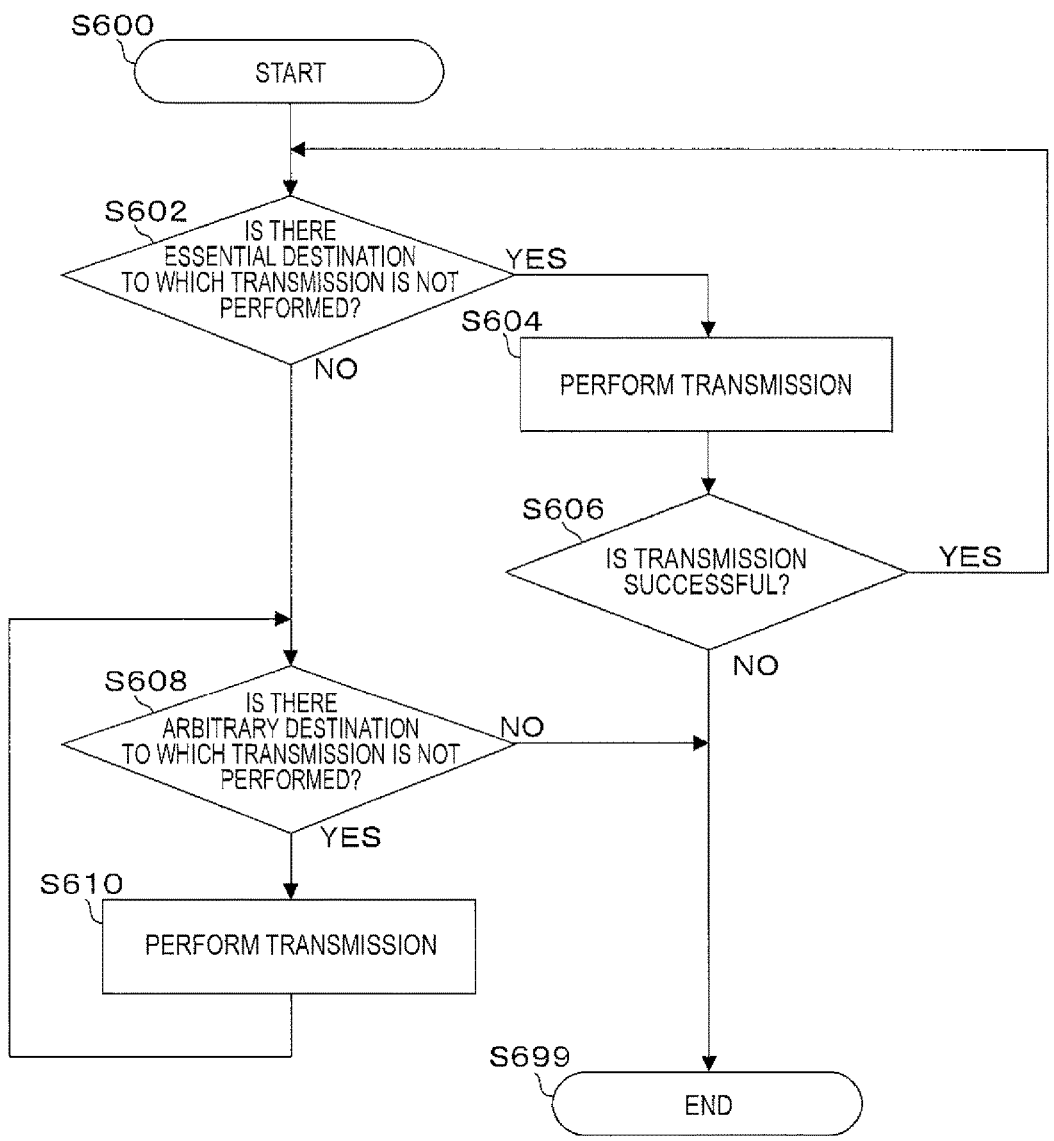

INFORMATION PROCESSING DEVICE, INFORMATION PROCESSING METHOD AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2016-053428 filed Mar. 17, 2016.

BACKGROUND

The present invention relates to an information processing device, an information processing method and a non-transitory computer readable medium storing an information processing program.

SUMMARY

According to an aspect of the invention, there is provided an information processing device comprising: a setting unit that, in a case where an image is transmitted to a plurality of destinations, performs setting of whether or not a destination of the image is an essential destination; and a transmission control unit that performs control such that: in a case where the destination of the image is the essential destination, transmission to the essential destination is performed prior to transmission to a non-essential destination; and, in a case where trouble occurs in the transmission to the essential destination, transmission subsequent to the transmission to the essential destination is ended.

BRIEF DESCRIPTION OF THE DRAWINGS

Exemplary embodiments of the present invention will be described in detail based on the following figures, wherein:

FIG. 2 is an explanatory diagram illustrating an example of a system configuration using the exemplary embodiment;

FIG. 3 is a flowchart illustrating an example of a process according to the first embodiment;

FIG. 4 is an explanatory diagram illustrating an example of the data structure of an address table;

FIG. 5 is an explanatory diagram illustrating an example of the data structure of the address table;

FIG. 6 is a flowchart illustrating an example of a process according to the first embodiment;

DETAILED DESCRIPTION

Hereinafter, examples of various embodiments which are suitable to realize the present invention will be described with reference to the accompanying drawings.

First Embodiment

Figure 1:
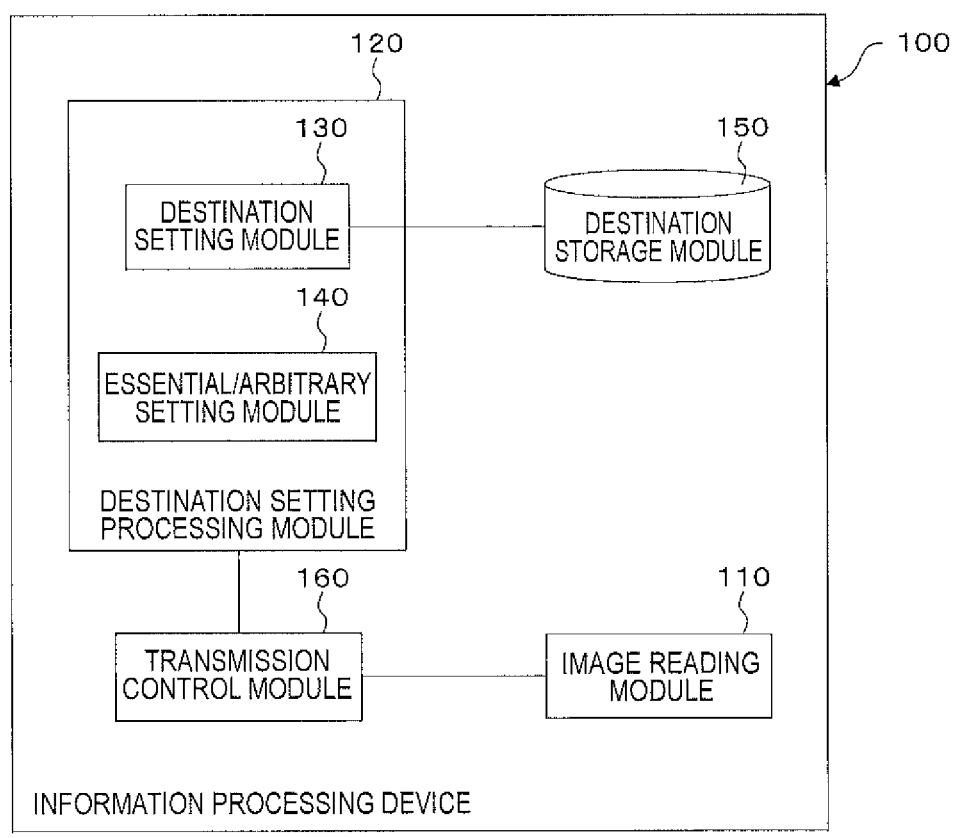
FIG. 1 is a conceptual module configuration diagram illustrating an example of a configuration according to a first embodiment.

FIG. 1 is a conceptual module configuration diagram illustrating an example of a configuration according to a first embodiment.

Meanwhile, modules typically indicate components, such as software (computer program) and hardware, which can be logically separated. Accordingly, modules in the exemplary embodiment indicate modules in a hardware configuration in addition to modules in a computer program. Therefore, in the exemplary embodiment, computer programs (a program which causes a computer to execute respective procedures, a program which causes the computer to function as respective sections, and a program which causes the computer to realize respective functions) which are caused to function as the modules, systems, and methods are described. Meanwhile, for convenience of explanation, the words "store", "cause to be stored", and equivalent words thereof are used. In a case in which the exemplary embodiment corresponds to a computer program, the words mean to store in a storage device or to perform control to be stored in the storage device. In addition, although modules may correspond to functions one by one, one module may be formed by one program, a plurality of modules may be formed by one program, or, on the contrary, one module may be formed by a plurality of programs for implementation. In addition, a plurality of modules may be executed by one computer or one module may be executed by a plurality of computers using computers in a distributed or parallel environment. Meanwhile, one module may include another module. In addition, hereinafter, "connection" is used in a case of logical connection (transmission and reception of data, instruction, reference relationship between data, or the like) in addition to physical connection. "Predetermined" indicates "determined before a process which is a target is performed", and is used while including a meaning of "determined according to a situation and a state at that time or according to a situation and a state until that time if a target process is not performed even in a case after a process according to the exemplary embodiment starts as well as a case before the process according to the exemplary embodiment starts. In a case in which there are a plurality of "predetermined values", the predetermined values may be different values, respectively, or two or more values (apparently including all the values) may be the same. In addition, description, which has a meaning of "in a case of A, perform B", is used as a meaning of "determine whether or not it is A, and perform B in a case in which it is determined to be A". However, a case in which it is not necessary to determine whether or not it is A is excluded.

In addition, a system or a device includes a configuration which is realized by one computer, hardware, one device, or the like in addition to a configuration in which a plurality of computers, hardware, devices, or the like are connected through communication devices, such as a network (including communication connection of one-to-one correspondence). The "device" and the "system" are used as synonymous terms. It is apparent that the "system" does not include a mere social "structure" (social system) which is an artificial decision.

In addition, in a case of each process performed by each module or a case in which a plurality of processes are performed in a module, target information is read from a storage device for each process, the process is performed, and the result of the process is written in the storage device. Accordingly, there is a case in which reading from the storage device before the process is performed and writing in the storage device after the process is performed may not be described. Meanwhile, here, the storage device may include a hard disk, a Random Access Memory (RAM), an external storage medium, a storage device connected through a communication line, a register in a Central Processing Unit (CPU), and the like.

An information processing device 100 according to the first embodiment transmits an image, and includes an image reading module 110, a destination setting processing module 120, a destination storage module 150, and a transmission control module 160, as illustrated in the example of FIG. 1.

The information processing device 100 receives an image and transmits the image. The information processing device 100 receives an image, for example, using ways that an image is read by a scanner, a camera, or the like, an image is received by a facsimile or the like from an external device through a communication line, and an image, which is stored in a hard disk (including an image which is connected through a network in addition to an image which is embedded in a computer) or the like, is read. Specifically, the information processing device 100 may include a scanner, a multifunction machine (an image processing device which has any of two or more functions of a scanner, a printer, a copying machine, a facsimile, and the like), or the like. The image may include a binary image or a multivalued image (including a color image). The received image may be one piece or a plurality of pieces. In addition, the content of the image may include a document which is used for business, a brochure for advertising, and the like.

In a case in which an image is transmitted, there is a case in which the image is transmitted to a plurality of destinations. As a detailed example, a multifunction machine has a scan multi-send function of performing scanning according to an instruction by a user and sending an image to a plurality of destinations. It is possible to divide the plurality of destinations into two types, that is, a (1) major destination and a (2) non-major destination. The "major destination" is a destination (destination which is intended by the user) to which an image scanned by the user should be transmitted. For example, the major destination is the information processing device or the other party in business.

The "non-major destination" may be a secondary destination other than the "major destination", and includes, for example, a destination which is determined as the rule of an organization to which the user belongs. Specifically, from a point of view of securing security, there is a destination for a copy (log) of the transmitted image. In this case, an image, which is the same as the image that is transmitted to the major destination, is stored in a predetermined server (hereinafter, referred to as a logging server) as the log. The logging server is the secondary destination. In the same manner, a way of realizing a logging function includes a way that, for example, an electronic mail (hereinafter, also referred to as a mail) to which the image is attached is transmitted to a superior through the scan multi-send.

At this time, there is a case (A) in which trouble occurs (communication fails) in transmission to the major destination and thus logging transmission is successful.

In contrast, there is a second case (B) in which the major transmission is successful, and thus the logging transmission fails.

In the case (A), even in a case in which transmission to the major destination fails, an image is transmitted to the logging destination through the scan multi-send. However, the image file is useless. Furthermore, if the major destination is corrected and the multi-send is performed again, the image is transmitted to the logging destination again.

In the case (B), a situation in which transmission to the major destination is successful but logging is not performed occurs, and thus logging reliability is lowered. The case (B) corresponds to a second embodiment.

The image reading module 110 is connected to the transmission control module 160. The image reading module 110 reads an image. For example, the image reading module 110 is the above-described scanner.

The destination setting processing module 120 includes a destination setting module 130 and an essential/arbitrary setting module 140, and is connected to the transmission control module 160. The destination setting processing module 120 sets the destination or the like of the image which is read by the image reading module 110.

The destination setting module 130 is connected to the destination storage module 150. The destination setting module 130 sets a plurality of destinations of the image which is read by the image reading module 110. The destination corresponds to, for example, a mail address and the address of a server or the like. The destination is set by, for example, an operation performed by the user. In addition, a predetermined destination may be set according to the user. If it is necessary to perform a login operation by the user in a case in which the information processing device 100 is used, the destination may be set using a table in which the user ID is associated with the destination because a user ID (IDentification) is determined.

The destination storage module 150 is connected to the destination setting module 130. The destination storage module 150 stores a destination (so-called address book). For example, the destination storage module 150 stores an address table 400 or an address table 500. FIG. 4 is an explanatory diagram illustrating an example of the data structure of the address table 400. The address table 400 includes a destination ID field 410, a user ID field 420, a destination field 430, and a destination name field 440. The destination ID field 410 stores information (destination ID) for uniquely identifying a destination in the exemplary embodiment. The user ID field 420 stores information (user ID) for uniquely identifying a user in the exemplary embodiment. The destination field 430 stores a destination which includes a mail address, the address of a server or the like, as described above. The destination name field 440 stores a destination name.

The destination setting module 130 may extract a destination (the destination field 430 of the address table 400) corresponding to the user ID of the user (user ID field 420 of the address table 400), and may display the name of the destination (the destination name field 440 of the address table 400) on a display device, such as the liquid crystal display of the information processing device 100, to be selected.

FIG. 5 is an explanatory diagram illustrating an example of the data structure of the address table 500. The address table 500 includes a destination ID field 510, a user ID field 520, a destination field 530, a destination name field 540, and a logging destination field 550. The address table 500 is acquired by adding the logging destination field 550 to the address table 400 illustrated in the example of FIG. 4. Accordingly, the destination ID field 510, the user ID field 520, the destination field 530, and the destination name field 540 are the same as the destination ID field 410, the user ID field 420, the destination field 430, and the destination name field 440 of the address table 400 illustrated in the example of FIG. 4. The destination ID field 510 stores the destination ID. The user ID field 520 stores the user ID. The destination field 530 stores the destination. The destination name field 540 stores the destination name. The logging destination field 550 stores information which indicates whether or not the destination is a logging destination.

The essential/arbitrary setting module 140 performs setting of whether or not the destination is an essential destination in a case of transmitting an image to a plurality of destinations (destinations which are set by the destination setting module 130). Meanwhile, although a "non-essential destination" is the above-described "non-major destination", the "non-essential destination" may be also referred to as an "arbitrary destination". The setting is performed according to, for example, the operation performed by the user. In addition, the predetermined destination may be set as the "essential destination" or the "arbitrary destination" according to the user. If the login operation of the user is necessary in a case in which the information processing device 100 is used, the destination may be set using a table in which the user ID is associated with the "essential destination" or the "arbitrary destination" because the user ID is known.

The transmission control module 160 is connected to the image reading module 110 and the destination setting processing module 120. The transmission control module 160 performs control such that, in a case in which the transmission control module 160 transmits an image and the destination is then the essential destination, transmission to the essential destination is performed prior to transmission to the non-essential destination and such that, in a case in which trouble occurs in transmission to the essential destination, subsequent transmission ends.

Further, the transmission control module 160 may perform control such that subsequent transmission is continued in a case in which trouble occurs in transmission to the non-essential destination.

FIG. 2 is an explanatory diagram illustrating an example of a system configuration using the exemplary embodiment.

An image processing device 200A includes an information processing device 100A, and corresponds to, for example, the above multifunction device.

The image processing device 200B includes an information processing device 100B, and corresponds to, for example, the above.

The information processing device 100A of the image processing device 200A, the information processing device 100B of the image processing device 200B, a user terminal 210A, a user terminal 210B, a user terminal 210C, a user (superior) terminal 220A, a user (superior) terminal 220B, a logging server 230A, and a logging server 230B are connected to each other through a communication line 290. The communication line 290 may be a wireless line, a wired line, or the combination thereof. For example, the communication line 290 may be the Internet, the intranet, or the like as the communication infrastructure. In addition, a function performed by the logging server 230 may be realized as a cloud service.

The destination includes the user terminal 210, the user (superior) terminal 220, and the logging server 230. The logging destination includes, for example, the logging server 230 and the user (superior) terminal 220.

The user reads an image using the image processing device 200A or the image processing device 200B, and transmits the image to the plurality of destinations using the scan multi-send function.

The discrimination between the "essential destination" and the "arbitrary destination" is set in the attribute of the destination. For example, the "essential destination" or the "arbitrary destination" is designated on a screen for setting the destination according to the operation of the user. Meanwhile, in a case in which the screen is displayed, a destination which is displayed as a default may be set for each image processing device 200 or the user, the operation of the user may be preserved as a past history, or a previous setting may be displayed as a default.

If a start button is pressed in a state in which any one of the "essential destination" and the "arbitrary destination" is designated, a process of the scan multi-send starts.

The image processing device 200 controls the sequence of transmission such that transmission to the "essential destination" is performed prior to the "arbitrary destination".

In a case in which transmission to any one of the "essential destination" fails, the scan multi-send process ends as an error.

In a case in which the whole transmission to the "essential destination" ends, transmission to the "arbitrary destination" starts. Meanwhile, even though transmission to the "arbitrary destination" fails, the process of the scan multi-send is continued.

In an operation method, if transmission to the primary object destination fails in a case in which a primary object destination is designated to the "essential destination" and the logging destination is designated to the "arbitrary destination", transmission to the logging destination is not performed, and thus useless logging is avoided.

In a contrary operation method, in a case in which the logging destination is designated to the "essential destination" and the primary object destination is designated to the "arbitrary destination", transmission to the primary object destination is performed only when logging is successful, and thus logging reliability increases.

In addition, it is possible to use to control a scan multi-send error.

The settings of the "essential destination" and the "arbitrary destination" are fixed as setting performed by a manager of the image processing device 200 such that selection is not performed by a general user.

For example, in a case in which communication control is performed while all the destinations are set as the "essential destinations", setting is performed such that a communication process stops if any of transmission fails.

In addition, in a case in which communication control is performed while all the destinations are set as the "arbitrary destinations", setting is performed such that the communication process is continued even though transmission fails.

FIG. 3 is a flowchart illustrating an example of a process according to the first embodiment.

In step S302, the destination setting module 130 extracts a destination from the destination storage module 150, and performs setting according to the operation performed by the user. Specifically, the destination setting module 130 extracts content of the destination name field 440 (or the destination name field 540) corresponding to the user ID of the user from the address table 400 (or the address table 500), and displays the content on the display device of the image processing device 200. Meanwhile, since the user performs login in a case in which the image processing device 200 is used, the user ID is determined before the process in step S302.

In step S304, the essential/arbitrary setting module 140 sets any one of the "essential destination" and the "arbitrary destination" for each destination. In a case in which the destination, which is set in step S302, is the logging destination for the user (specifically, in a case in which information indicative of the logging destination is stored in the logging destination field 550 of the address table 500), the destination may be the arbitrary destination. Further, in a case in which the destination is not the logging destination, the destination may be the essential destination.

In addition, in contrast, the destination, which is set in step S302, is the logging destination for the user, the destination may be the essential destination. Further, in a case in which the destination is not the logging destination, the destination may be the arbitrary destination.

In step S306, the image reading module 110 reads an image.

In step S308, the transmission control module 160 transmits the image to the destination according to the setting of the "essential destination" or the "arbitrary destination". The process in step S308 will be described with reference to a flowchart illustrated in an example of FIG. 6.

FIG. 6 is a flowchart illustrating an example of a process according to the first embodiment.

In step S602, it is determined whether or not there is an "essential destination" to which transmission is not performed. In a case in which there is an "essential destination" to which transmission is not performed, the process proceeds to step S604. Otherwise, the process proceeds to step S608.

In step S604, the image is transmitted to the destination.

In step S606, it is determined whether or not transmission is successful. In a case in which transmission is successful, the process returns to step S602. Otherwise, the process ends (step S699).

In step S608, it is determined whether or not there is an "arbitrary destination" to which transmission is not performed. In a case in which there is an "arbitrary destination" to which transmission is not performed, the process proceeds to step S610. Otherwise, the process ends (step S699). Meanwhile, the processes subsequent to step S608 are performed in a case in which there is not an "essential destination" to which transmission is not performed, and thus trouble does not occur in transmission to the "essential destination.

In step S610, the image is transmitted to the destination, and the process returns to step S608. In this case, even though trouble occurs in transmission, transmission to a subsequent destination is performed.

Figure 7:
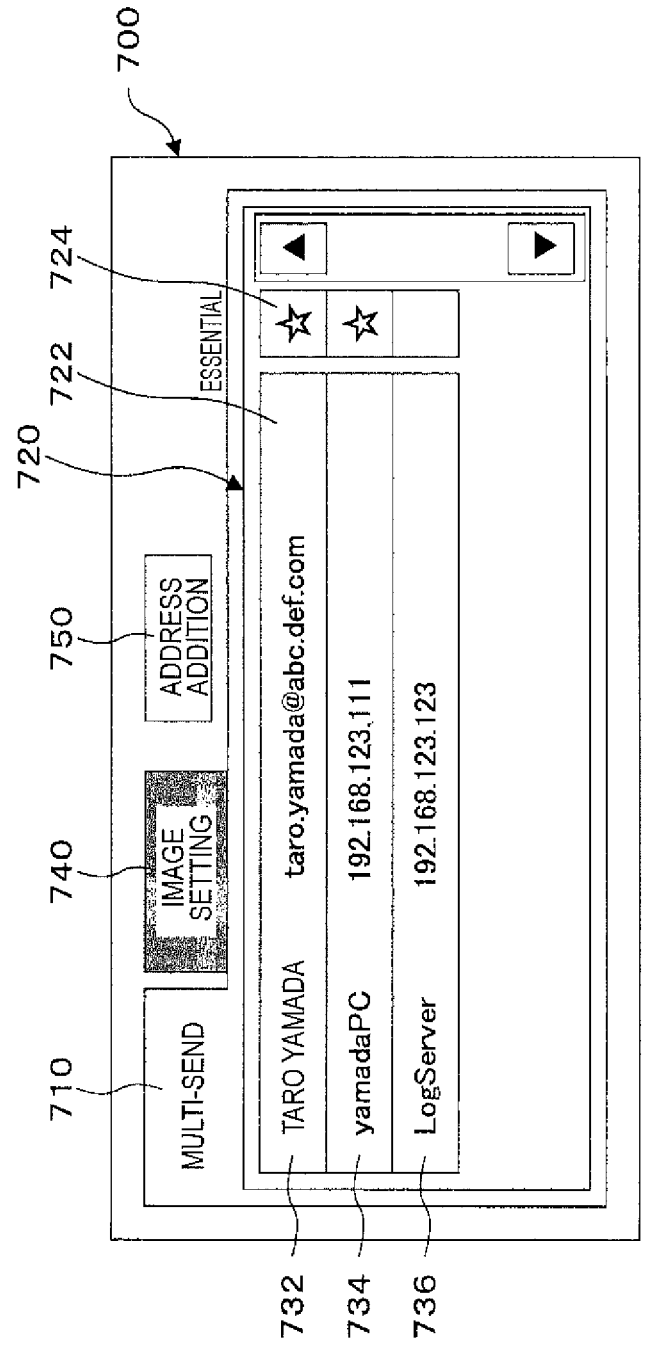
FIG. 7 is an explanatory diagram illustrating an example of the display of a screen according to the first embodiment.

FIG. 7 is an explanatory diagram illustrating an example of the display of a screen 700 according to the first embodiment. The information processing device 100 includes a display device, such as a liquid crystal display, and displays content, which is illustrated in the example of FIG. 7, on the screen 700 of the display device.

A multi-send tag 710 and an image setting tag 740 are displayed to be selectable in the screen 700.

A destination display list 720 is displayed in the multi-send tag 710. The destination display list 720 includes an address field 722 and an essential destination designating field 724.

A destination (Taro Yamada) 732, a destination (yamada PC) 734, and a destination (Log Server) 736 are displayed as the address field 722. Further, accordingly, the essential destination designating field 724, which designates whether or not the destination is the "essential destination", is displayed. The user designates whether or not the destination is the "essential destination" in the essential destination designating field 724 for each destination. Meanwhile, in a case in which a recipient addition button 750 is pressed, a destination corresponding to the user is displayed, and it is possible to add the destination.

Second Embodiment

Figure 8:
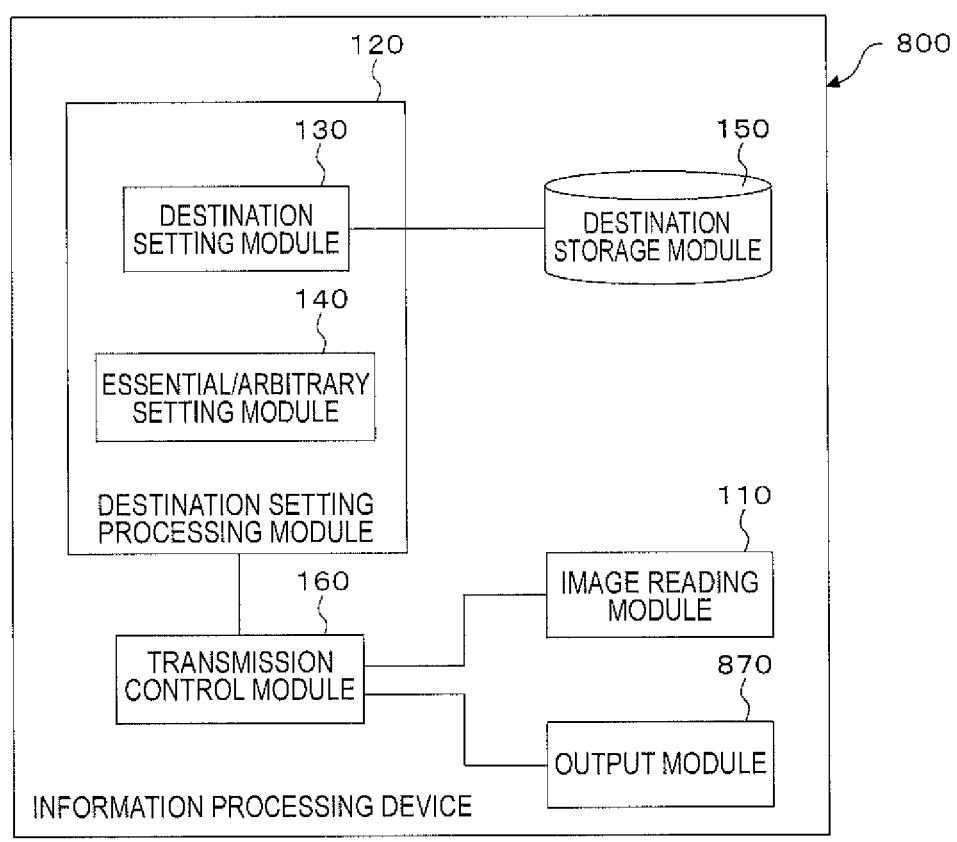
FIG. 8 is a conceptual module configuration diagram illustrating an example of a configuration according to a second embodiment.

FIG. 8 is a conceptual module configuration diagram illustrating an example of a configuration according to a second embodiment.

An information processing device 800 includes an image reading module 110, a destination setting processing module 120, a destination storage module 150, a transmission control module 160, and an output module 870. Meanwhile, the same reference numerals are attached to the same components as in the first embodiment and the description thereof will not be repeated.

The image reading module 110 is connected to the transmission control module 160.

The destination setting processing module 120 includes a destination setting module 130 and an essential/arbitrary setting module 140, and is connected to the transmission control module 160.

The destination setting module 130 is connected to the destination storage module 150. The destination setting module 130 has a function of setting whether or not the destination of an image is a logging destination, in addition to the function according to the first embodiment. The setting is performed according to, for example, an operation performed by a user. In addition, the setting of a predetermined destination may be performed according to the user.

The destination storage module 150 is connected to the destination setting module 130.

The transmission control module 160 is connected to the image reading module 110, the destination setting processing module 120, and the output module 870.

The output module 870 is connected to the transmission control module 160. If trouble occurs in transmission to a destination which is a logging destination that stores the copy of the image and is a non-essential destination, the output module 870 outputs the fact that an image is transmitted. Meanwhile, the occurrence of the trouble indicates that transmission to the essential destination is completed (successful). Here, a way of the output may include a way in which it is possible to record and remain that the trouble occurs. For example, the way of the output corresponds to a way of performing print by the print device of a printer or the like, a way of transmitting a mail to a manager of the information processing device 800 or the logging server 230, a way of transmitting an image by the image transmission device of a facsimile or the like, a way of storing the image in a storage medium, such as a memory card, a way of delivering the image to another information processing device, or the like.

In addition, the fact that "transmission of an image is performed" as the content of the output may include at least a destination (a destination in which transmission is completed and a destination in which trouble occurs in transmission), and may include transmission date and time, an error message, a transmitted image (for example, a reduction image), or the like in addition thereto.

In the second embodiment, a process is performed according to the flowchart illustrated in the example of FIG. 3.

Figure 9:
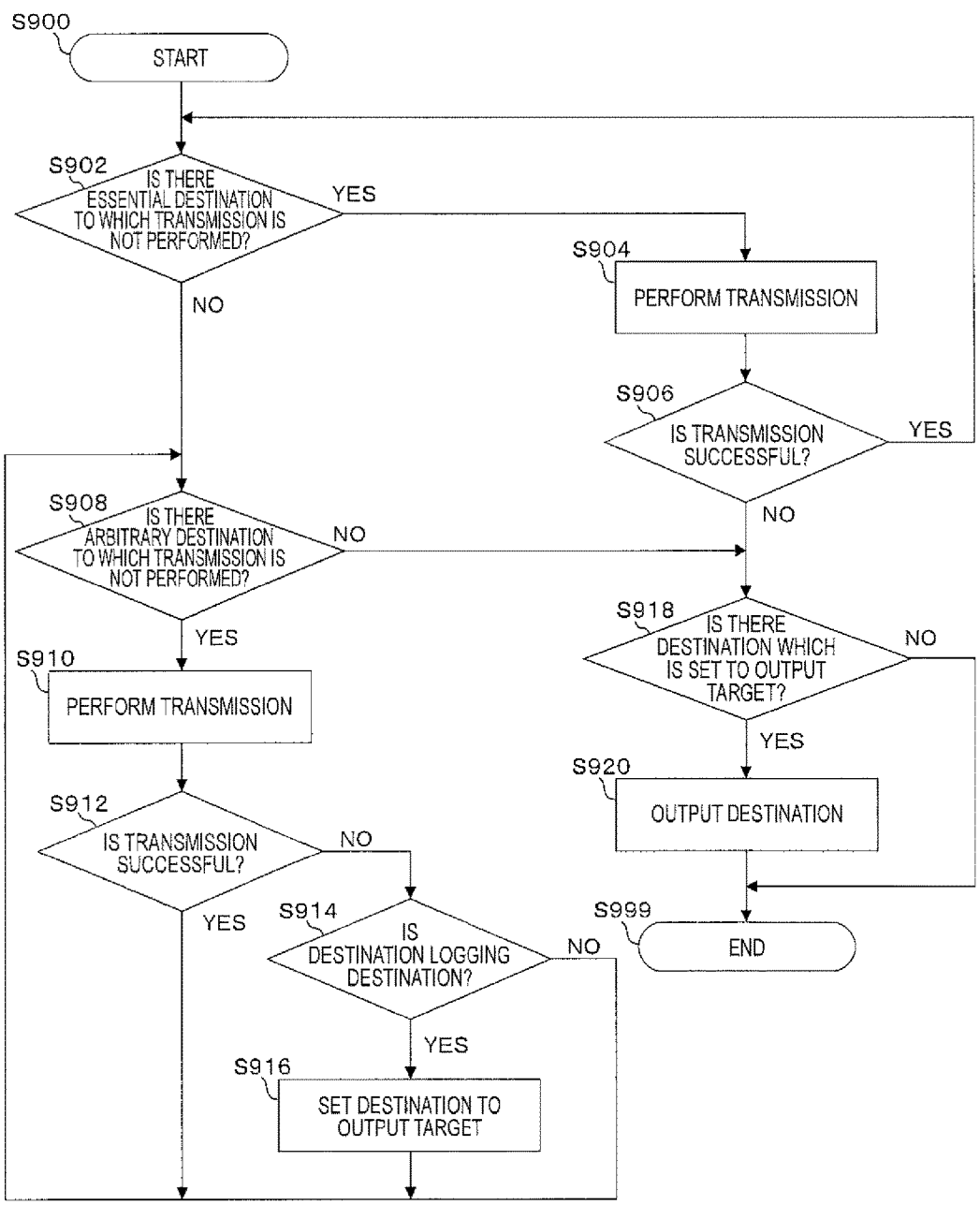
FIG. 9 is a flowchart illustrating an example of a process according to the second embodiment.

However, in step S308, a process according to a flowchart illustrated in an example of FIG. 9 is performed.

FIG. 9 is a flowchart illustrating an example of the process according to the second embodiment.

In step S902, it is determined whether or not there is an "essential destination" to which transmission is not performed. In a case in which there is an "essential destination" to which transmission is not performed, the process proceeds to step S904. Otherwise, the process proceeds to step S908.

In step S904, an image is transmitted to the destination.

In step S906, it is determined whether or not transmission is successful. In a case in which transmission is successful, the process returns to step S902. Otherwise, the process proceeds to step S918.

In step S908, it is determined whether or not there is an "arbitrary destination" to which transmission is not performed. In a case in which there is an "arbitrary destination" to which transmission is not performed, the process proceeds to step S910. Otherwise, the process proceeds to step S918.

In step S910, the image is transmitted to the destination.

In step S912, it is determined whether or not transmission is successful. In a case in which transmission is successful, the process returns to step S908. Otherwise, the process proceeds to step S914.

In step S914, it is determined whether or not the destination is the logging destination. In a case in which the destination is the logging destination, the process proceeds to step S916. Otherwise, the process returns to step S908.

In step S916, the destination is set to an output target, and the process returns to step S908. The destination is set to the output target in order to store data to be output in subsequent step S920.

In step S918, it is determined whether or not there is the destination which is set to the output target. In a case in which there is the destination which is set to the output target, the process proceeds to step S920. Otherwise, the process ends (step S999).

In step S920, the output module 870 outputs the destination.

The second embodiment is different from the first embodiment in a process performed in a case in which trouble occurs in transmission to the logging destination which is the "arbitrary destination".

If it is possible to record the fact that the image is transmitted in logging, there is a case in which an object is completed even in a process other than recording through image reception. Meanwhile, here, the object is to record that the image is transmitted in order to secure security.

In a case in which only transmission to the logging destination fails in a state in which the primary object destination is the "essential destination" and the logging destination is the "arbitrary destination", a transmission error report is output (printed). Although the image is not recorded in the logging destination, the fact that the image is transmitted is recorded by the transmission error report.

Meanwhile, even though the setting is performed on the information processing device 800 such that the "transmission error report is not output", the transmission error report is forcibly output in a case in which a transmission error is generated in the logging destination which is the "arbitrary destination". In addition, it may be possible to set whether a function of outputting the transmission error report is valid or invalid.

In addition, as another output, the transmission error may be notified to the information processing device 800 or the manager of the logging server 230 of the logging destination using a mail. Since logging is set by the manager in many cases, it is possible for the manager to recognize the abnormality of logging reception by providing a notification to the manager.

Figure 10:
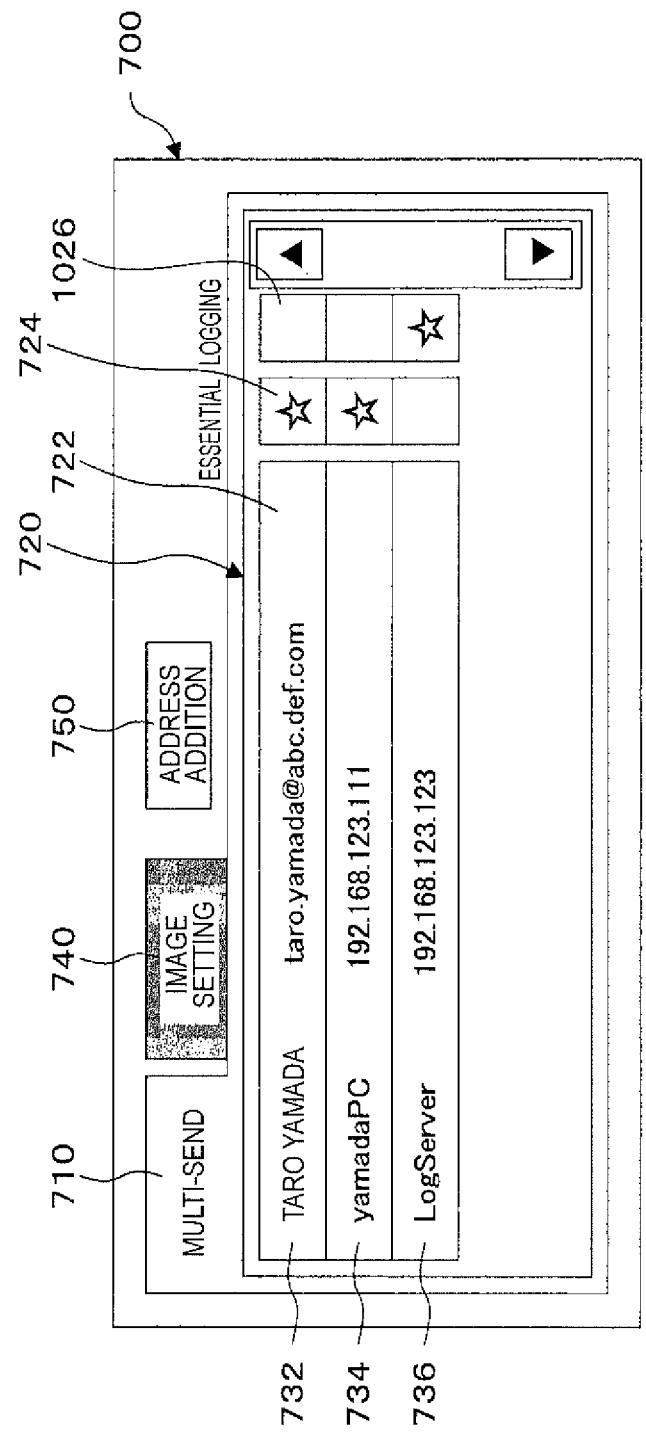
FIG. 10 is an explanatory diagram illustrating an example of the display of a screen according to the second embodiment.

FIG. 10 is an explanatory diagram illustrating an example of the display of the screen 700 according to the second embodiment. FIG. 10 is acquired in such a way that a logging destination designating field 1026 is added to the screen 700 illustrated in the example of FIG. 7 in the description of the first embodiment.

In the screen 700 illustrated in the example of FIG. 7, it is possible to designate the essential destination by the essential destination designating field 724. Furthermore, it is possible to designate the logging destination by the logging destination designating field 1026 in the multi-send tag 710 illustrated in the example of FIG. 10. In a case in which a "non-essential destination" is designated by the essential destination designating field 724, a "logging destination" is designated by the logging destination designating field 1026, and trouble occurs in the logging destination, the transmission error report is output.

Figure 11:
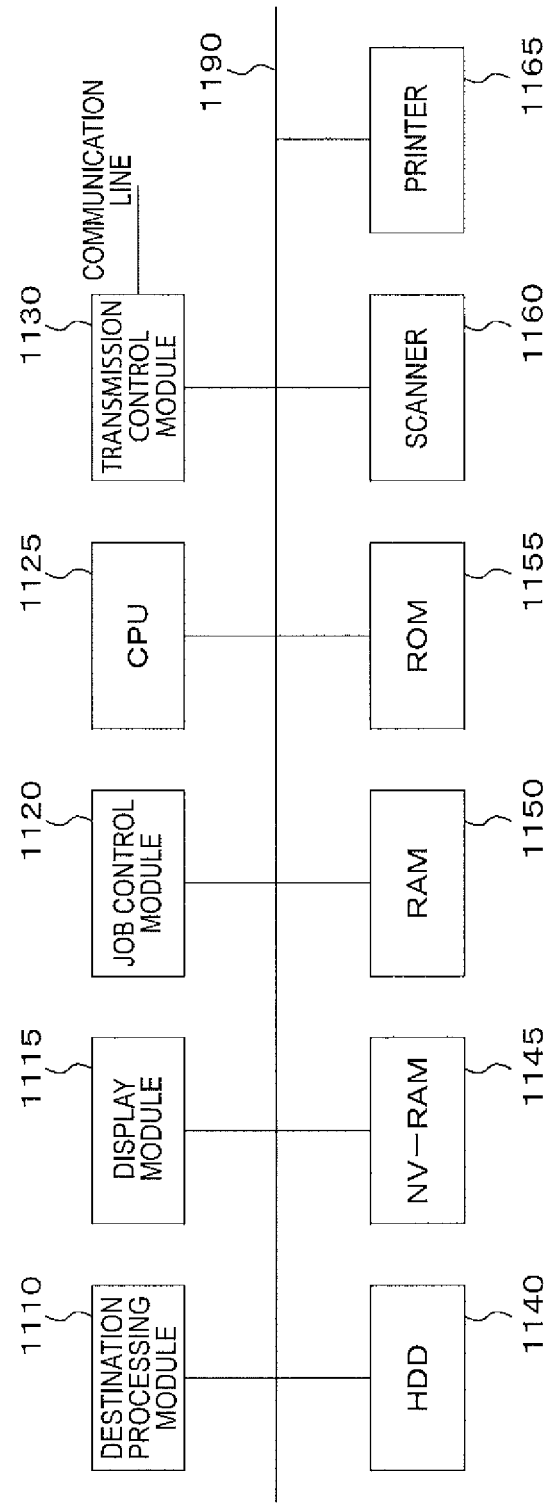
FIG. 11 is a block diagram illustrating an example of the hardware configuration of a computer which realizes the exemplary embodiment.

FIG. 11 is a block diagram illustrating an example of the hardware configuration of a computer which realizes the exemplary embodiment.

A destination processing module 1110, a display module 1115, a job control module 1120, a CPU 1125, a transmission control module 1130, an HDD 1140, an NV-RAM 1145, a RAM 1150, a ROM 1155, a scanner 1160, and a printer 1165 are connected to each other through a bus 1190. The configuration illustrated in FIG. 11 is formed by, for example, a personal computer (PC) or the like, and illustrates an example of the hardware configuration which includes the scanner 1160 that reads an image, and the printer 1165 which performs printing.

The Central Processing Unit (CPU) 1125 is a control unit which executes a process according to a computer program that describes the execution sequence of each of the various modules which are described in the above-described exemplary embodiment, that is, the destination setting processing module 120, the destination setting module 130, the essential/arbitrary setting module 140, the transmission control module 160, and the like.

The Read Only Memory (ROM) 1155 stores programs, arithmetic parameters, and the like which are used by the CPU 1125. The Random Access Memory (RAM) 1150 stores programs, which are used when the CPU 1125 is executed, and parameters which are appropriately changed in the execution of the CPU 1125. The NV-RAM 1145 is a non-volatile memory and stores various types of setting and the like.

A Hard Disk Drive (HDD) 1140 includes a built-in hard disk (which may be a flash memory or the like), drives the hard disk, and records and reproduces a program and information which are executed by the CPU 1125. The hard disk realizes the function as the destination storage module 150 or the like. Furthermore, other various data, various computer programs, and the like are stored in the HDD 1140.

The display module 1115 includes a liquid crystal display device, a Cathode Ray Tube (CRT), and the like, and displays various pieces of information as text and image information. Meanwhile, the display module 1115 may include a pointing device or the like, such as a keyboard which receives an operation by an operator. In addition, the display module 1115 may include a touch screen which has the functions of both the pointing device and the display.

The destination processing module 1110 has a function of the destination setting processing module 120. The job control module 1120 has a function of performing a scan process, a print process, or the like in the information processing device 100 (image processing device 200). The transmission control module 1130 has a function of the transmission control module 160, is connected to the communication line, and performs a data communication process with the outside. The scanner 1160 has a function of the image reading module 110, and performs a document reading process. The printer 1165 has a function of the output module 870, and performs a document data outputting process.

Meanwhile, the hardware configuration illustrated in FIG. 11 illustrates one example of the configuration. The exemplary embodiment is not limited to the configuration illustrated in FIG. 11, and may include a configuration in which it is possible to execute the modules described in the exemplary embodiment. For example, some modules may be formed by dedicated hardware (for example, Application Specific Integrated Circuit (ASIC) or the like), some modules may be included in an external system and connected by a communication line, and, further, a plurality of systems illustrated in FIG. 11 may be connected with each other by the communication line so as to perform cooperative operations with each other. In addition, specifically, the modules may be embedded into a copying machine, a facsimile, a scanner, a printer, a multi-function machine, or the like in addition to the personal computer.

Meanwhile, the above-described program may be provided after being stored in the recording medium or the program may be provided by the communication devices. In this case, for example, the above-described program may be understood as the invention of a "computer readable recording medium storing a program".

The "computer readable recording medium storing a program" indicates a computer readable recording medium in which a program is recorded, the computer readable recording medium being used for installation, execution, and distribution of the program.

Meanwhile, the recording medium includes, for example, a "DVD-R, a DVD-RW, a DVDRAM, and the like", which are Digital Versatile Disks (DVD) and are standards formulated in a DVD forum, a "DVD+R, a DVD+RW, and the like" which are standards formulated at the DVD+RW, a read-only memory (CD-ROM), a CD recordable (CD-R), a CD rewritable (CD-RW), and the like which are Compact Disks (CD), a BLU-RAY (registered trade mark) Disc, a Magneto-Optical (MO) disk, a Flexible Disk (FD), a magnetic tape, a hard disk, a Read-Only Memory (ROM), an Electrically Erasable Programmable Read-Only Memory (EEPROM (registered trade mark)), a flash memory, a Random Access Memory (RAM), a Secure Digital (SD) memory card, and the like.

Further, the whole or a part of the program may be preserved or distributed after being recorded in the recording medium. In addition, the program may be transmitted through a transmission medium, such as a wired network, a wireless communication network, or the combination thereof, which is used for, for example, a Local Area Network (LAN), a Metropolitan Area Network (MAN), a Wide Area Network (WAN), the Internet, the Intranet, the Extranet, or the like depending on communication. In addition, the program may be transported by being placed on carrier waves.

Furthermore, the program may be a part or the whole of another program, or may be recorded in a recording medium together with an individual program. In addition, the program may be divided and recorded in a plurality of recording media. In addition, if it is possible to restore the program through compression, encryption, or the like, the program may be recorded in any type of manner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a memory; and
   a central processing unit (CPU) programmed to execute:
      a setting module that, when an image is transmitted to a plurality of destinations, performs setting of whether or not a destination of the image is an essential destination; and
      a transmission control module that performs control such that:
         when the destination of the image is the essential destination, transmission to the essential destination is performed prior to transmission to a non-essential destination; and,
         when trouble occurs in the transmission to the essential destination, transmission subsequent to the transmission to the essential destination is ended.

2. The information processing device according to claim 1, wherein
   the transmission control module performs control such that, when trouble occurs in the transmission to the non-essential destination, transmission subsequent to the transmission to the non-essential destination is continued.

3. The information processing device according to claim 2, wherein the CPU is further programmed to execute:
   an output module that outputs a fact that the image is transmitted when trouble occurs in transmission to a destination for storing a copy of the image that is the non-essential destination.

4. The information processing device according to claim 3, wherein the CPU is further programmed to execute:
   a second setting module that performs setting of whether or not the destination of the image is the non-essential destination.

5. The information processing device according to claim 1, wherein the CPU is further programmed to execute:
   an output module that outputs a fact that the image is transmitted when trouble occurs in transmission to a destination for storing a copy of the image that is the non-essential destination.

6. The information processing device according to claim 5, wherein the CPU is further programmed to execute:
   a second setting module that performs setting of whether or not the destination of the image is the non-essential destination.

7. An information processing method comprising:
when an image is transmitted to a plurality of destinations, performing setting of whether or not a destination of the image is an essential destination; and
performing control such that:
when the destination of the image is the essential destination, transmission to the essential destination is performed prior to transmission to a non-essential destination; and
when trouble occurs in the transmission to the essential destination, transmission subsequent to the transmission to the essential destination is ended.

8. The information processing method according to claim 7, wherein
control is performed such that, when trouble occurs in the transmission to the non-essential destination, transmission subsequent to the transmission to the non-essential destination is continued.

9. The information processing method according to claim 8, further comprising:
outputting a fact that the image is transmitted when trouble occurs in transmission to a destination for storing a copy of the image that is the non-essential destination.

10. The information processing method according to claim 9, further comprising:
performing setting of whether or not the destination of the image is the non-essential destination.

11. The information processing method according to claim 7, further comprising:
outputting a fact that the image is transmitted when trouble occurs in transmission to a destination for storing a copy of the image that is the non-essential destination.

12. The information processing method according to claim 11, further comprising:
performing setting of whether or not the destination of the image is the non-essential destination.

13. A non-transitory computer readable medium storing an information processing program causing a computer to execute a process comprising:
when an image is transmitted to a plurality of destinations, performing setting of whether or not a destination of the image is an essential destination; and
performing control such that:
when the destination of the image is the essential destination, transmission to the essential destination is performed prior to transmission to a non-essential destination; and
when trouble occurs in the transmission to the essential destination, transmission subsequent to the transmission to the essential destination is ended.

14. The non-transitory computer readable medium according to claim 13, wherein, in the process,
control is performed such that, when trouble occurs in the transmission to the non-essential destination, transmission subsequent to the transmission to the non-essential destination is continued.

15. The non-transitory computer readable medium according to claim 14, wherein the process further comprises:
outputting a fact that the image is transmitted when trouble occurs in transmission to a destination for storing a copy of the image that is the non-essential destination.

16. The non-transitory computer readable medium according to claim 15, wherein the process further comprises:
performing setting of whether or not the destination of the image is the non-essential destination.

17. The non-transitory computer readable medium according to claim 13, wherein the process further comprises:
outputting a fact that the image is transmitted when trouble occurs in transmission to a destination for storing a copy of the image that is the non-essential destination.

18. The non-transitory computer readable medium according to claim 17, wherein the process further comprises:
performing setting of whether or not the destination of the image is the non-essential destination.

* * * * *